US008489638B2

(12) United States Patent
Kuszmaul et al.

(10) Patent No.: US 8,489,638 B2
(45) Date of Patent: Jul. 16, 2013

(54) DISK-RESIDENT STREAMING DICTIONARY

(75) Inventors: Bradley C. Kuszmaul, Lexington, MA (US); Michael A. Bender, East Northport, NY (US); Martin Farach-Colton, New York, NY (US)

(73) Assignees: Massachusetts Institute of TechnologyMA (US); Research Foundation of State University of New YorkNY (US); Rutgers University

( * ) Notice: Subject to any disclaimer, the term of this patent is extended or adjusted under 35 U.S.C. 154(b) by 0 days.

(21) Appl. No.: 13/476,826

(22) Filed: May 21, 2012

(65) Prior Publication Data

US 2012/0254253 A1   Oct. 4, 2012

Related U.S. Application Data

(63) Continuation of application No. 11/760,379, filed on Jun. 8, 2007, now Pat. No. 8,185,551.

(51) Int. Cl.
*G06F 7/00* (2006.01)
*G06F 17/30* (2006.01)

(52) U.S. Cl.
USPC .......................................... 707/790; 707/705

(58) Field of Classification Search
None
See application file for complete search history.

(56) References Cited

U.S. PATENT DOCUMENTS 8,090,704 B2 * 1/2012 Archer et al. ................. 707/708
2005/0102255 A1 * 5/2005 Bultman ......................... 707/1

OTHER PUBLICATIONS

Goetz Graefe, B-Tree Indexes for High Update Rates, Mar. 2006, ACM SIGMOD Record, vol. 35 issue 1, pp. 39-44.*
Lars Arge, The buffer tree: A new technique for optimal I/O-algorithms, 1995, vol. 955/1995, pp. 334-345.*

* cited by examiner

*Primary Examiner* — Pierre Vital
*Assistant Examiner* — Taelor Kim
(74) *Attorney, Agent, or Firm* — Anderson Gorecki & Rouille LLP

(57) ABSTRACT

A method, apparatus and computer program product for storing data in a disk storage system is presented. A dictionary data structure is defined and stored on the disk storage system. Key-value pairs can be inserted and deleted into the dictionary data structure, with full transactional semantics, at a rate that is faster than one insertion per disk-head movement. Keys can be looked up with only a logarithmic number of transfers, even for keys that have been recently inserted or deleted. Queries can be performed on ranges of key-value pairs, including recently inserted or deleted pairs, at a constant fraction of the bandwidth of the disk. The dictionary employs indirect logging for physical block logging.

31 Claims, 4 Drawing Sheets

DISK-RESIDENT STREAMING DICTIONARY

CROSS REFERENCE TO RELATED APPLICATIONS

The present application is a continuation of application Ser. No. 11/760,379, filed on Jun. 8, 2007 now U.S. Pat. No. 8,185,551, entitled, "Disk-Resident Streaming Dictionary", the contents and teachings of which are hereby incorporated by reference in their entirety.

This invention was made with government support under grant numbers CCF0621511, AC10324974, CNS0305606, and CNS0540248 awarded by the National Science Foundation. The government has certain rights in this invention.

BACKGROUND

This invention relates to the storage of information on computer-readable medium such as disk drives.

Notation

We use the following notation:

O: The "big-Oh" notation is used to indicate how fast a function grows, ignoring constant factors. Let $f(n)$ and $g(n)$ be non-decreasing functions defined over the positive integers. Then we say that $f(n)$ is $O(g(n))$ if there is exist positive constants $c$ and $n_0$ such that for all $n > n_0$, $f(n) < cg(n)$.

$\Omega$: The "big-Omega" notation is used similarly. We say that $f(n)$ is $\Omega(g(n))$ if $g(n)$ is $O(f(n))$.

$\Theta$: The "big-Theta" notation is the intersection of big-Oh and big-Omega. $f(n)$ is $\Theta(g(n))$ exactly when $f(n)$ is $O(g(n))$ and $f(n)$ is $\Omega(g(n))$.

log I is the logarithm of I in the natural base e.

$\log_B$ I is the logarithm of I, base B.

$\lceil x \rceil$ is the smallest integer greater than or equal to x.

Dictionaries

Modern networks can generate high-bandwidth streams of data in which data is produced at an order of magnitude, or more, faster than it can be inserted into today's databases. Examples of such data streams including billing data, point-of-sale data, sensor data from a particle accelerator, astronomical data from an optical or radio telescope, and data from video feeds in an airport or train station.

This data can be collected at increasingly high rates, but the core technology for indexing and searching the data cannot keep pace. The result is that databases and data warehouses can be days to weeks out of date, and can only store a fraction of the available data. Often technicians write special-purpose programs to insert the data in a batch into the data warehouse or database, and much scientific data that has been collected has never been indexed.

Almost all databases or file systems employ a data dictionary mapping keys to values.

A dictionary is a mapping from keys to values. Keys are totally ordered, using a comparison function. For example, strings can be totally ordered lexicographically. A value is sequence, possibly of length zero, of bits or bytes. A dictionary can be thought of as containing key-value pairs. Given a key, the system can find the key's associated value in the dictionary. If there is no key-value pair matching the key then the system reports that no such key-value pair exists. Given a key, finding the corresponding key-value pair if it exists, and reporting the nonexistence if it does not exist is called looking up the key. Also, given a key k, the system can find the successor of k in the dictionary, that is find the smallest key greater than k in the dictionary. The system can also find the predecessor. Another common dictionary operation is to perform a range scan on the dictionary: Given two keys k, and k', find all the key-value pairs $\langle k'', v \rangle$, such that $k \leq k'' \leq k'$. A range scan can be implemented by looking up the smallest key k" such that $k \leq k''$, and then using the successor operation to find additional keys until one bigger than k' is found.

Some dictionaries allow duplicate keys to be stored, and may allow the same key-value pair to be stored more than once, without overwriting the previous value. Typically, in such dictionaries, the successor operation returns key-value pairs, sometimes returning identical keys or values on successive operations.

SUMMARY

This invention can be used to implement dictionaries. It will be apparent to one of ordinary skill in the art that there are multiple ways to implement dictionaries, including a buffered B-tree and a cascading array, and that logging can be employed to provide transactional support for the dictionaries.

In a particular embodiment of a method of storing data in a disk storage system, the method includes defining a dictionary data structure stored on the disk storage system.

Other embodiments include a computer-readable medium having computer-readable code thereon for storing data in a disk storage system. The computer readable medium includes instructions for defining a dictionary data structure stored on the disk storage system.

Still other embodiments include a computerized device, configured to process all the method operations disclosed herein as embodiments of the invention. In such embodiments, the computerized device includes a processor, a main memory, and a disk. The memory system is encoded with a process that provides a disk-resident streaming dictionary as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a disk-resident streaming dictionary as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied a data storage system, as method of storing data, as a software program, as software and hardware, or as hardware and/or circuitry alone, such as within a data storage device. The features of the invention, as explained herein, may be employed in data storage devices and/or software systems for such devices.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Buffered B-Tree

Figure 1:
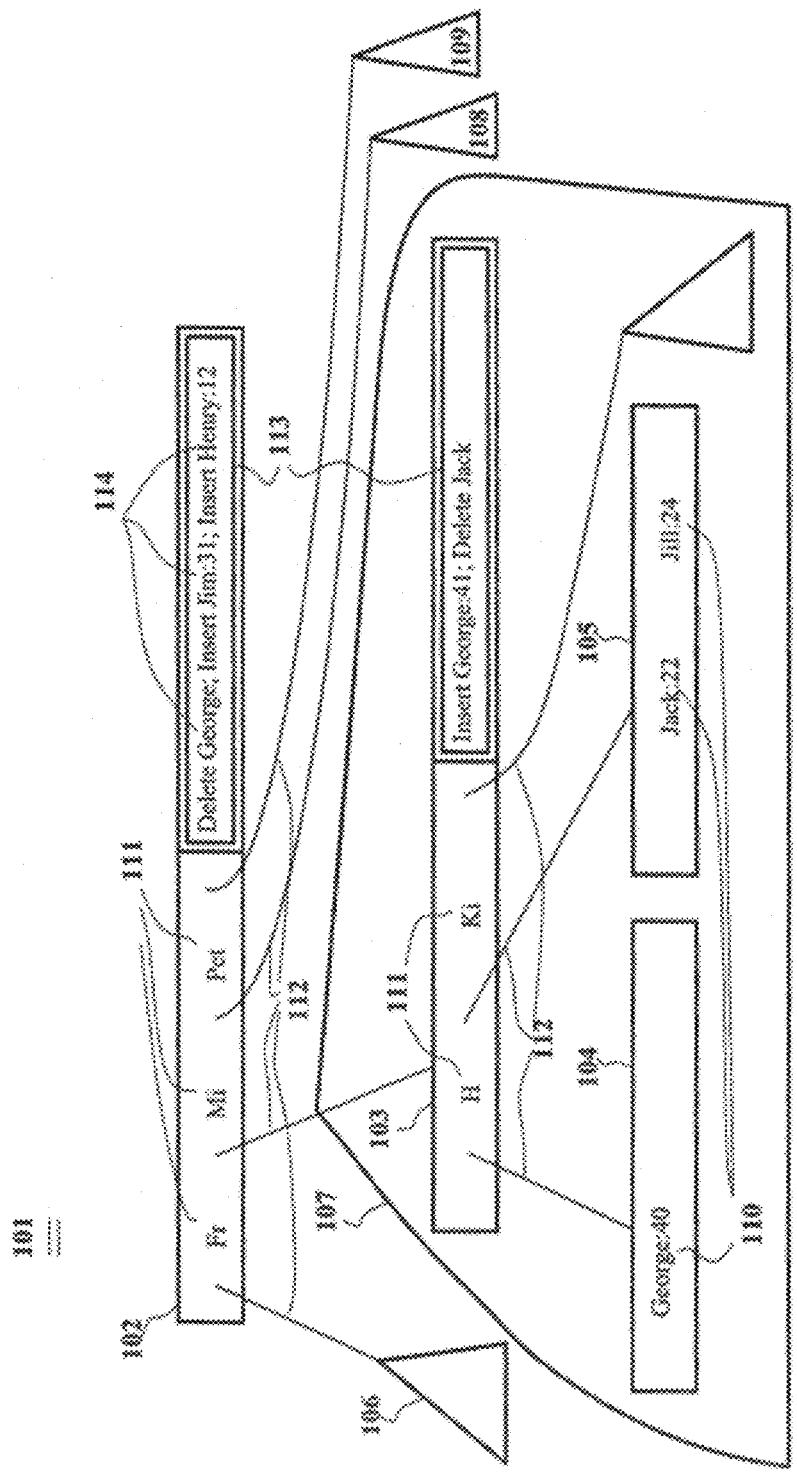
FIG. 1 depicts a buffered B-tree.

Referring now to FIG. 1, an example of a buffered B-tree (BBT) 101 is shown. A BBT implements a dictionary which can be used for applications such as file systems and databases. In particular, functions such as look up, store, successor, and predecessor operations are performed in the file systems and databases. It should be appreciated that the BBT described here is a very small example of a BBT for explanation purposes, and that typically a BBT would be much larger and include many more internal nodes and leaf nodes.

A BBT 101 is a data structure organized as a tree of nodes. Generally a BBT has a root node 102. The root node contains pointers to subtrees 106, 107, 108, and 109. In the figure, some subtrees (106, 108, 109) are not shown in detail, and are represented as triangles. One of subtrees 107 is shown in expanded form, and itself has a root node 103, and subtrees. Eventually the leaves of the tree 104 105 are reached, and the leaves have no children. The leaf nodes contain key-value pairs 110. In this example, the keys are names (George, Jack, and Jill), and the values are numbers which might denote the respective ages of the named individuals. Non-leaf nodes contain pivot keys 111 as well as pointers 112 to subtrees. The leaves of the tree collectively contain all the key-value pairs, sorted by key. Thus a subtree contains a contiguous range of keys. The pivot keys indicate which contiguous range of keys are in a particular subtree.

The number of children of a node is called the node's degree. For the purpose of analysis and discussion, it is convenient to assume that all nodes have the same number of children, although in practice the degree of the nodes in a tree varies because the sizes of the pivot keys may vary and in order to keep the tree balanced or of uniform depth.

A dictionary is typically stored on disk. In this embodiment a computer system comprising a processor, a main memory, and a disk is employed. The BBT is stored on the disk. The nodes must be copied from the disk to the main memory before their contents can be accessed by a computer's processor. If the main memory is already full, then one of the nodes already present must be removed. If that node has been modified, then it must be written back to disk before it is deleted from main memory. Since disk accesses are slower than main memory, one useful way to measure the performance of a disk-resident B-tree is to count the number of nodes that must be moved between disk and main memory. Each such copy or movement is called a disk transfer.

For example, consider node 102. Subtree 106 contains all key-value pairs for which the key is less than or equal to "Fr". Subtree 107, which is rooted at node 103, contains all key-value pairs for which the key is greater than "Fr" and less than or equal to "Mi". Subtree 108 contains all key-value pairs for which the key is greater than "Mi" and less than or equal to "Pet". Subtree 109 contains all key-value pairs for which the key is greater than "Pet".

Similarly, for node 103, keys between "H" (exclusive) and "Ki" (inclusive) are stored subtree rooted at node 105. In this example, node 105 is a leaf node, and has no further subtrees, and so the key-value pairs 110 for the region H-Ki are stored directly.

The non-leaf nodes also include a buffer 113. The buffer 113 contains commands 114 to insert or delete particular key-value pairs. An insert command provides at least a key-value pair. A delete command provides at least a key.

The depth of a node is the distance from the root node to the node following links in the tree. Hence the root node is of depth 0. In the data structure explained here, the leaf nodes all have the same depth. It will be apparent to one of ordinary skill in the art that there are variations on this data structure. For example, the tree does not necessarily need to be of uniform depth. The leaf nodes of the tree contain key-value pairs.

Thus, each non-leaf node of the tree contain the identities of its children, and also contain pivot keys that are used to distinguish between the children. Each non-leaf node also contains a buffer of commands.

In principle, each key-value pair stored in the tree belongs at a particular leaf node. In this embodiment, pairs are sometimes stored in a buffer at an ancestor of the leaf node to which the pair belongs.

The set of all keys mentioned in a subtree rooted at anode includes all the keys stored in key value pairs of the leaf nodes of the subtree, and all the pivot keys stored at the non-leaf nodes of the subtree, and all the keys included in commands stored in the buffers of the non-leaf nodes of the subtree.

Consider a node with C>0 children. The children of a node are numbered from 0 to C−1 (inclusive). For each i, where $1 \leq i < C$, the keys mentioned in the subtree rooted at Child (i−1) are all less than the keys mentioned in the subtree rooted at Child i. The pivot keys of a node are numbered from 0 to C−2 (inclusive). (If C=1 then there are no pivot keys.) For each i, where $0 \leq i < C-1$, pivot key i is greater than all the keys mentioned in the subtree rooted at Child i, and is less than or equal to all the keys mentioned in the subtree rooted at Child (i+1).

At any given point in time, it is possible that the buffer is empty, that is, that it contains no commands.

To look up a key in a BBT, consider the example of looking up Jill's age. The system starts at the root node 102, and looks through the commands in the buffer. If a command containing key Jill is found, then stop. In this example, the root does not identify Jill in its buffered commands. Next determine which child contains Jill by looking at the pivot keys 111, and follow the appropriate child pointer 112, in this example to node 103. Again, look for Jill in the buffer. Since Jill is not present, use the pivot keys to determine which child pointer to follow, ending up at node 105, where Jill is present, and the value 24 can be returned.

Another example of looking up a value in the BBT illustrates what happens if a command identifies a key that is being looked up. If the system looks up Jim's age, the system finds "Insert Jim:31" in the commands 114 stored in the buffer 113 of node 102. In that case, the system has determined that Jim's age is 31.

If the system were to look up George's age, a "Delete George" command would be found in the commands 114 of the root node 102. In that case, the system would indicate that George's age is not recorded in the dictionary. This behavior is correct, even though it appears that there is an entry for George in node 104, and there is another insert command for George in node 103. Any command in an ancestor of a node supersedes the node's values. Since George is deleted by a command in the root node 102, the record for George is treated as though it has been deleted from the entire tree.

To insert a key-value pair into an internal node of the tree, there are two cases. When the root's buffer has enough free space to hold the key-value pair, then the key-value pair is inserted into the buffer at the root. Otherwise, a child is selected, and one or more pairs are moved from the root buffer into the child, inserting pairs into the child runs the same algorithm recursively: That is if the child's buffer has enough space, insert it, otherwise move some keys into a grandchild. It is helpful to pick a child to which many pairs belong, so that much data is transferred to the child, at the cost of referencing only one child. Other ways of picking a child can also be employed.

If a pair is inserted into a leaf node, then the leaf node is split, as follows When inserting into a leaf node if the leaf node fills up, then the node is divided into two nodes, the key-value pairs are divided between the two nodes, and the new node is placed, as a child pointer, along with a pivot key in the parent of the split node. This may in turn cause the parent node to overflow because there are more pivots keys and child pointers than it can hold. In that case the parent is split, and a new child pointer node is inserted into the grandparent. This splitting will occasionally progress all the way up to the root, and if the root splits, then a new root is created that contains two children. When splitting a non-leaf node, the commands in the buffer 113 must also be split among the new nodes, to maintain the property that each command is kept in a node which is an ancestor of the leaf to which the command will eventually be pushed.

Similarly, when values are deleted, a node can become underfull. When two sibling nodes are sufficiently underfull, they can be merged, reducing the number of nodes in the tree.

Referring again to FIG. 1, to insert a key value pair, if there is space, the system places an insert command in the buffer 113 of the root node 102. If there is not enough space, then space must be created. To create space in the buffer of a node, the system moves some commands from the buffer down to the appropriate child, in a process called pushing. In this example, all the commands in the buffer are destined for the same child, node 103. If some of the commands were destined for different children, the system would pick the child for which the most commands or data are destined, and push commands to that child. If that child in turn overflows, then commands are pushed from that child to that child's child. If a command is pushed into a node where there is another command on the same key, the new command supersedes the old one. So if the command "Delete George" is pushed from node 102 to node 103, then the system removes "Insert George:41" from node 103.

If an insert command is pushed to a leaf node, then the key-value pair is stored in the leaf, overwriting any previous key-value pair with the same key.

To delete any pair that has a particular key, the system inserts a delete command into the root buffer, identifying the key to be deleted. As the delete command progresses down the tree, any commands with matching keys that are found in the tree are removed. If a delete command is pushed to a leaf node, then any previous key-value pair with the same key is removed from the leaf node, and the delete command itself is discarded. When sibling leaf nodes become sufficiently empty, they are merged together. That merging reduces the number of children of their parent. If, as a result, a parent has sufficiently few children, then it is merged with its sibling, and the merging can propagate up the tree, forming the reverse operation of the insertion splitting.

If a node is full, and commands are pushed to a child, it may be that the child fills up before all the commands can be pushed. One way to avoid inducing a large number of disk transfers for a single insertion is described here. In the embodiment described here, the system pushes only the commands that belong to a single child (the child that has the most commands destined to it) rather than pushing all the commands. While pushing to a child, if the child overflows, then the system stops pushing to that child, and starts pushing from that child to a single grandchild. After completing the push from the child to a grandchild (which may in turn require pushing from the grandchild to a great grandchild), the child will now have a free space. At that point, the system can resume pushing from the node to the child, but stops pushing just before the child would overflow again. At that point the node itself is guaranteed to have free space, and the original insertion can complete. Since this sequence of insertions and pushes touches only one node at each level of the BBT, the number of disk transfers in the worst case is only proportional to the height of the tree which is $O(\log_B N)$.

Typically, when a value is pushed from a node to its child, many values are pushed. In particular, if a node has degree d and the buffer contains K bytes in its buffer, then the system will move at least K/d bytes for the cost of referencing only one child If commands are i bytes in size, then the system would be moving at least K/(di) commands for every disk read. Since each command is transferred at most $O(\log_B N)$ times (once per level of the tree), each insertion of an i-byte command requires, on average, $O((\log_B N)/(K/(di))$ disk reads. For example, if we choose $d=\sqrt{B/i}$, then $K=O(B)$, then each insertion requires on average $O((\log_B N)/\sqrt{B/i})$ disk reads, even for the worst-case insertion pattern.

It will be apparent to one of ordinary skill in the art that there are other rules for pushing from nodes to children that achieve good average and worst-case performance. For example, once some commands have been pushed down a particular root-to-leaf path, additional commands can be pushed without changing the number of disk transfers as long as the nodes remain in main memory.

It will be apparent to one of ordinary skill in the art that certain optimizations are possible for the BBT structure. For example, if a node and one of its children are both in main memory, then it may be useful to immediately move appropriate commands from the node to its child, rather than to wait for the node to overflow. This optimization never increases the number of disk transfers if the child node has been modified and the child node has space for the command. If the child node has not been modified then this change can sometimes result in increasing the number of transfers, since the child will become modified, and will eventually have to be written to disk. However, even in this case, the number of disk transfers cannot more than double, since it required a disk transfer to bring the child into main memory in the first place.

To implement range scans on the tree it suffices to implement the successor operation. At a particular moment in time, the successor to a particular key could appear in the leaf node where that key resides (or will eventually be pushed to.) If the key is the last key in the leaf buffer (or eventually will be when it is pushed), then the successor could appear in the next leaf node that would be encountered in a left-to-right depth-first search of the tree. The successor could also appear in a buffer of an ancestor of one of the leafs where the successor can appear. Thus to find a successor involves examining one or two leaf nodes and one or two non-leaf nodes at every level of the tree.

It will be apparent to one of ordinary skill in the art that there are several ways to implement the successor operation. One way is to examine all appropriate leaf nodes and non-leaf nodes, and find the smallest key that is larger than the given key.

Another way to implement the successor operation is to push everything down to the leaf node where the given key belongs. This is accomplished by searching the tree, and pushing values down as the search progresses. For example, referring to FIG. 1, to find the successor of Jack, the system starts at the root node 102. Then the system determines which child of node 102 Jack belongs in, which turns out to be node 103. Everything in the range Fr-Mi is pushed from node 102 to node 103. In this example, all three commands 114 in the buffer 113 of 102 are pushed down. Assuming there is space in node 103 for all the commands, after this push, node 103 contains the following commands Delete George; Delete Jack; Insert Jim:31; Insert Henry:12 since the command to insert George has been superseded.

Next the system determines which child of node 103 will hold Jack, which turns out to be node 105. The system pushes every command in the range from node 103 to node 105. This means that the buffer of node 103 becomes Delete George.

and the leaf node 105 will now hold

Henry:12 Jill:24 Jim:31

Note that the command for George was not pushed in this case. It is not necessary to push values toward leaf nodes that cannot contain Jack or Jack's successor. Although it is not necessary, it may be advantageous to push George in some situations. Also note that the system could have avoided pushing any value that was less than Jack. For example, it was not necessary to push the "Insert Henry:12" command down, since Henry is before Jack, and so can not affect the result of the successor operation. Also note that after pushing values down, Jack is not present in the tree any more. The successor of Jack exists anyway, and is Jill in this case.

There are also cases where a key that is ordered later than Jack needs not be pushed. For example, if the system were aware that Jill was present in the tree (and not deleted), there would be no need to push Jim down, since Jim cannot be the answer.

During a successor operation, commands are pushed down the tree. These push operations may incur some disk transfers. However, the cost of each such transfers can be charged against the transfers that are necessary to compute the successor. Those pushes can be viewed as part of the cost of the range query, rather than part of the cost of the original insertions and deletions. That is, to compute the successor, all the nodes down the appropriate leaf must be present in memory. The pushes thus do not increase the asymptotic number of disk transfers.

Each leaf node contains a set of key-value pairs. The key-value pair set is organized allow fast searches and insertions while it is in main memory. The set may be organized as a balanced binary search tree (e.g., a red-black tree or an AVL tree), or it may be organized as a B-tree (thus the overall B-tree contains nodes comprised of smaller B-trees), or it may be organized as a packed memory array. One could even organize those smaller B-trees so that their nodes are organized as even smaller B-trees. For some cases, the set could be organized as hash tables (for example, if the performance of the successor operation is not important.) Other data structures to represent the set will be apparent to one of ordinary skill in the art.

Each non-leaf node contains a buffer. The approach outlined above, in which values are pushed down the tree when performing a successor operation, provides the advantage that the buffers of non-leaf nodes need not support efficient successor and predecessor operations. For example, the buffers could be implemented as a hash table, rather than as a tree structure.

It will be apparent to one of ordinary skill in the art that there are other ways to implement the successor operation efficiently, producing an efficient range query. A range query takes the form of performing a sequence of successor operations, looking for example a Jack, Jack's successor Jill, Jill's successor Jim, and so forth. Such a range query incurs $O(1+s/B+\log_d N)$ disk transfers in the worst case where s is the total amount of data returned by the range query, B is the leaf block size, d is the average degree of the tree, and N is the total number of leaf nodes in the tree.

It will be apparent to one of ordinary skill in the art that the predecessor operation is similar to the successor operation.

It will be apparent to one of ordinary skill in the art that there are other ways to implement range queries on the BBT. For example, one could implement a cursor object that points into the tree, and can be moved forward and back, allowing the retrieval of the value being pointed at by the cursor. The cursor could be implemented by keeping track of all the locations in the tree where the key pointed to by the cursor could be located. Alternatively, the cursor could arrange to push values down the tree, and keep track of the one location in the leaf where the key belongs. One advantage of a cursor instead of providing only a successor operation is that it provides a way to access the keys in a dictionary where duplicate keys are permitted.

It is not necessary for the node to be represented the same way on disk as it is represented in main memory. That is, when anode is read in from disk, the system could reorganize the data to make it convenient for access in main memory. Then when the system writes a node back to disk, it could organize the data to be convenient for disk-I/O. In the embodiment presented here, when the system reads a node from disk, it builds an AVL tree of the commands in the buffer. When the system writes a node to disk, the commands of the buffer are written as a sorted array. If data compression is employed, the sorting can make data compression more effective by grouping similar keys near each other.

As a matter of preferred practice, the storage system will organize the nodes into blocks. In this embodiment, a block is a sequence of bytes on a disk drive which can hold a node. A block could be a few bytes or it could be many megabytes. The system maintains a cache, in main memory, of recently accessed blocks. Furthermore, a log of changes made to the data structure helps the system recover from failures, such as power failures.

One problem faced by storage systems that employ large blocks is that large block writes to disk are not atomic. The write could be interrupted, for example by a power failure. In that case, the block on disk could contain some old data and some new data. It will be apparent to one of ordinary skill in the art that there are several ways to solve this problem. In this embodiment, when a block is evicted from main memory the block is be written to a currently unused location on disk. If the write is interrupted then there is still a valid version in the old location. The system maintains a directory of where each block is physically stored on disk. Changes to the directory are recorded in the update log.

During use, the blocks are organized into two categories: in-use and free. The system maintains the collection of free blocks using, for example, a free list, a bitmap identifying free blocks, or other well known data structures for maintaining a collection of free blocks. The blocks that are in use are used to store the dictionary data. In some cases, a BBT could be used to store the status of each block. Since such a block dictionary is smaller than the original dictionary, a simpler block storage scheme can be used to manage the blocks that comprise the block dictionary.

For a single disk drive such as Hitachi Deskstar SATA 7K250, we have found that a BBT achieves good performance with a block size of about a million bytes, and in which internal nodes have degree on the order of 10 to 100. Other block sizes and degrees also give good performance for such a drive. Furthermore as disk sizes and speeds change, and as processor speeds change, and as memory sizes and speeds change, and as other relevant technologies change, the range of block sizes and degrees that give good performance may change. One of ordinary skill in the art will be able to determine, both by analytical and by empirical means, given a computer technology, what ranges of block sizes and degrees achieve good performance.

The presently described approach for writing to new locations is useful even in the context of a single disk drive, and does not require any particular RAID configuration.

The BBT could also be organized as a multirooted tree. In this embodiment, instead of employing a single root node for the BBT, several root nodes are employed. The root nodes can share their children. In this way, insertions can be performed concurrently on different root nodes. Instead of sharing children, the root nodes could each have distinct children, but they could share their grandchildren. In general, a dictionary could be implemented by several trees that share subtrees between them.

Although this embodiment implements a dictionary without duplicate keys, it will be apparent to one of ordinary skill in the art how to implement duplicate keys.

Cascading Array

Figure 2:
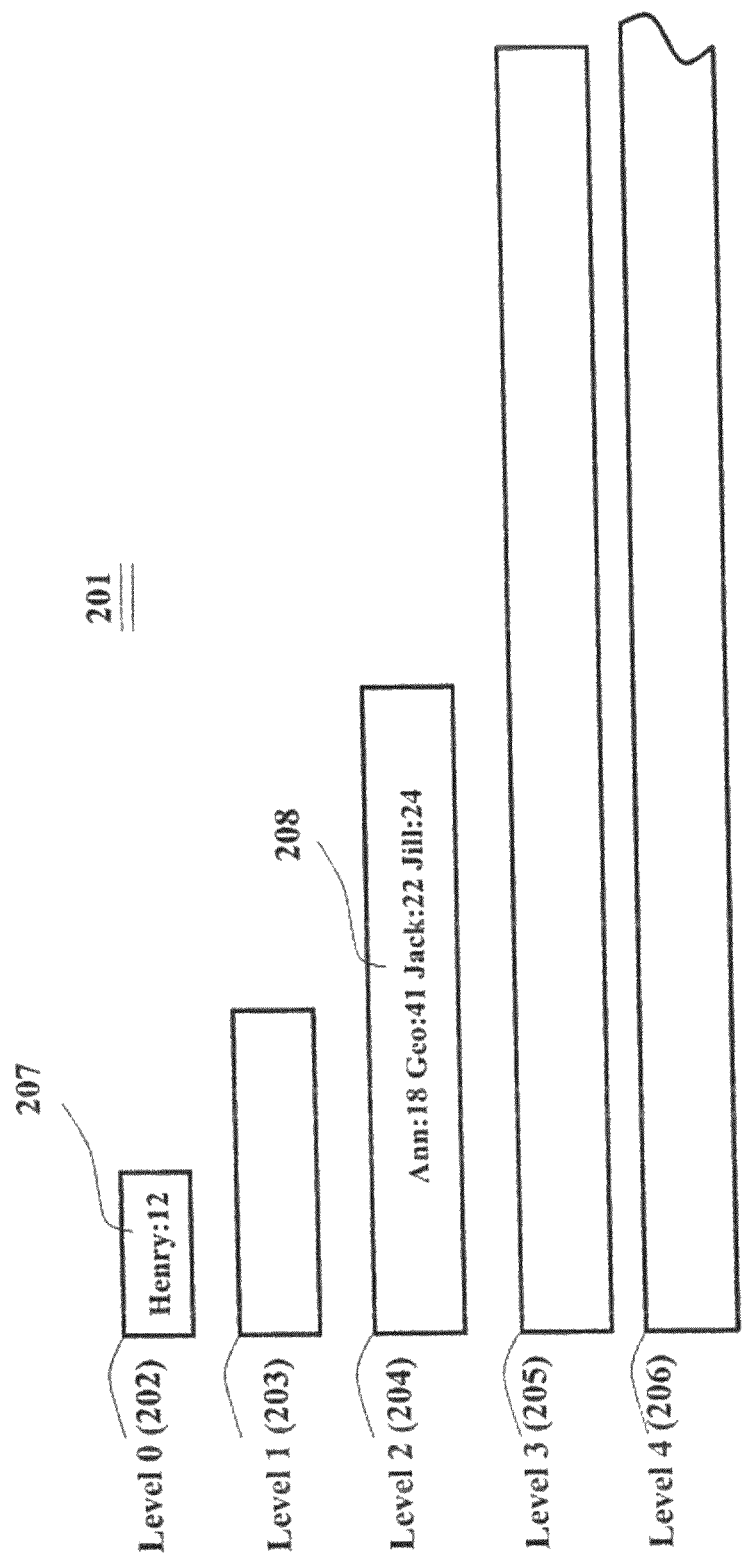
FIG. 2 depicts a simple cascading array containing 5 key-value pairs.

Referring now to FIG. 2, a simple cascading array (SCA) data structure 201 is shown. The structure shown in 201 includes a first array 202 including a first (possibly empty) collection of key-value pairs, a second array 203 including a second (possibly empty) collection of key-value pairs, a third array 204, a fourth array 205, and a fifth array 206.

At any given point of time the SCA holds N key-value pairs, and is organized as $\lceil 1+\log_2 N \rceil$ arrays, or levels. The kth level (starting with k=0) includes space for $2^k$ key-value pairs. Each level is either completely full of key-value pairs or is empty of key-value pairs. Each level also contains other information besides the key-value pairs. The levels are stored contiguously in memory. The SCA maintains the following invariants:

1. The kth level contains items if and only if the kth east significant bit of the binary representation of N is a 1.
2. Each level contains key-value pairs sorted in ascending order by key.

To maintain these invariants, when a new item is inserted it is inserted in level 0. The system then performs a carry operation. One way to understand the operation is that the system first creates a level of length one with the new item, and as long as there are two levels of the same length, the system merges them into the next bigger size.

For simplicity of explanation, consider a SCA in which data is inserted, but not deleted. Referring again to FIG. 2, Level 0 (202) contains one key-value pair Henry:12

207, Level 1 (203) contains no key-value pairs, Level 2 (204) contains 4 key-value pairs (208), and Level 3 (205) contains no key-value pairs. This SCA contains 5 key-value pairs. Consider the binary representation of the number 5, which is 101. Because the rightmost digit of the binary representation is a 1, Level 0 contains pairs. Since the next digit to the left is a 0, Level 1 is empty. Since the next digit to the left is a 1, Level 2 is full, containing 4 pairs.

To insert another pair, such as

Figure 3:
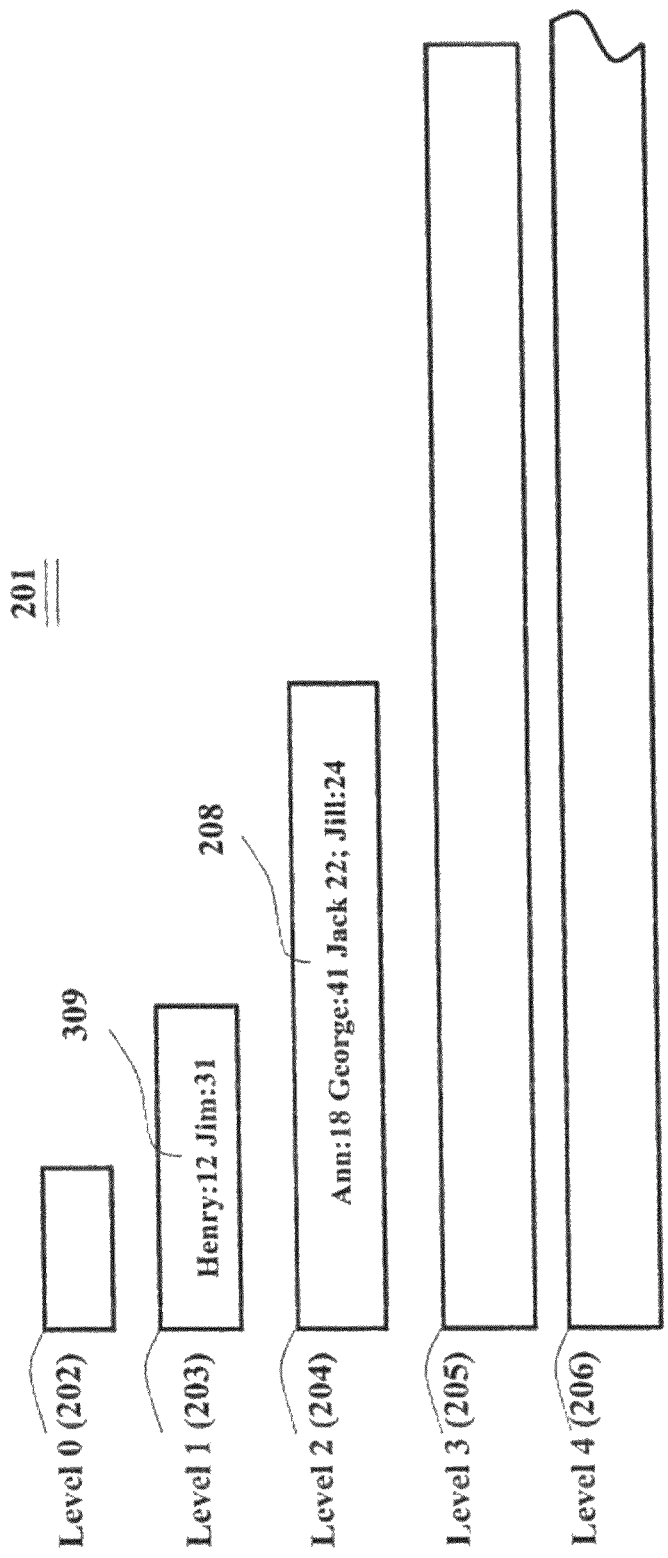
FIG. 3 depicts a simple cascading array containing 6 key-value pairs.

Jim:31, the system attempts to merge the key-value pair of Level 0 (202) with the new key-value pair. Since this merged collection would be overfill, the system takes the two keys and put them in Level 1 (203). Since Level 1 is not overfull, the "carry" operation is complete. The updated SCA is shown in FIG. 3, in which Level 0 (202) is now empty, and Level 1 (203) now contains two key-value pairs 309.

It will be clear to one of ordinary skill in the art, from this description of the SCA and the previous discussion of the BBT, how to implement deletions efficiently.

Performing N insertions and deletions, starting with an empty SCA, incurs an average of $O((\log N)/B)$ disk transfers per operation.

In an SCA, searches can be implemented by binary searching separately in each of the $O(\log N)$ levels for a total of $O(\log^2 N)$ disk transfers.

Searches are made faster in an embodiment called the cascading array (CA). In a CA, every eighth element in the (k+1)st array also appears in the kth array, with an extra pointer called a real lookahead pointer to its location in the (k+1)st array. Each fourth cell (including the real lookahead pointers) in the kth array is reserved for an extra pointer called a duplicate lookahead pointer, which holds pointers to the nearest real lookahead pointer to its left and right. Thus, every level uses half its space for actual items and half for lookahead pointers.

It will be apparent to one of ordinary skill in the art that the number of real lookahead pointers and the number of duplicate lookahead pointers can be varied. For example, instead of including a real lookahead pointer in every eight element, one could be included in every sixteenth element. Including fewer lookahead pointers reduces the amount of storage space required by the data structure and increases the number of transfers required to perform a search in the worst case.

Lemma: A CA with lookahead pointers incurs $O(\log N)$ block transfers for each search.

Proof: To simplify the proof, on each level store $-\infty$ and $+\infty$ in the first and last cell and give them real lookahead pointers.

The following proves inductively that a search for key r, the CA examines at most eight contiguous items in each level and that r is greater than or equal to the smallest of these and less than or equal to the largest of these. This induction will establish both the time bound and correctness of the search procedure.

Figure 4:
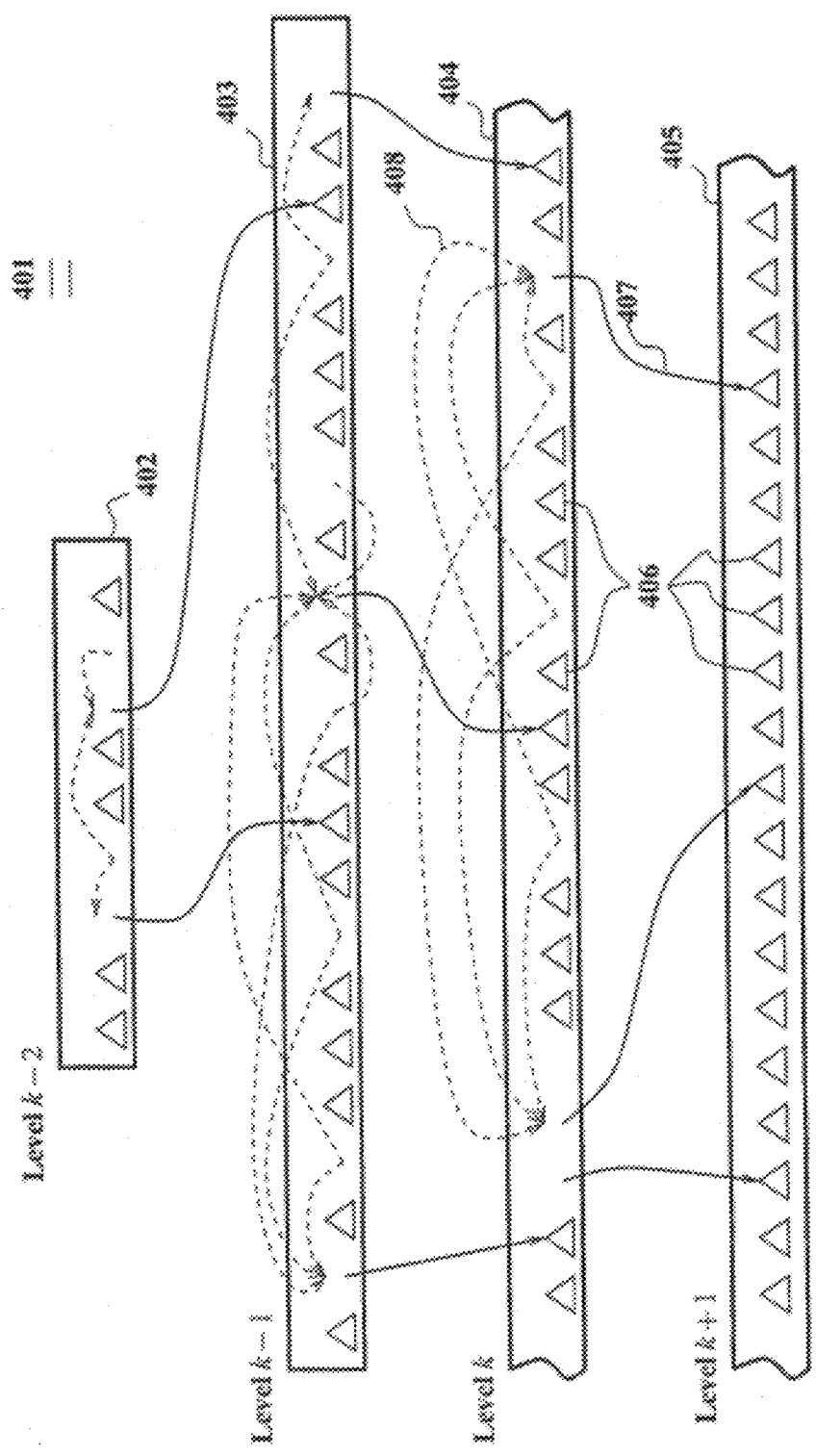
FIG. 4 depicts the organization of pointers, lookahead pointers, and duplicate lookahead pointers in a cascading array.

The proof refers to FIG. 4, which shows four adjacent levels of the CA. A particular level, Level k is shown 404. The next higher level is Level (k+1) is shown 405 below Level k. Level (k+1) in this example is the highest numbered level, and requires no lookahead pointers. Level (k−1) is shown 403 above Level k. Level (k−2 is shown 402 above Level (k−1). Key-value pairs are shown as small triangles 406. Real lookahead pointers 407 are shown as arrows from one level to the next. Duplicate lookahead pointers 408 are shown as arrows drawn with dotted lines that point from a level to another location in the same level.

The lemma is true in the first three levels, because each has size at most eight (even with the −∞ and +∞ pointers added). Suppose the lemma is true at level k (counting levels from 0), where k≧3, and the search in level k examined contiguous items with keys $r_1 < r_2 < \ldots < r_8$ and that $r_1 \leq r \leq r_8$.

Let j be such that $r_j \leq r < r_{j+1}$. If $r_j = r$ then the procedure has found the target element 406 or real lookahead pointers 407 that lead to the target element. In this first case the induction goes through trivially for all remaining levels. Otherwise, $r_j < r$. In this second case the CA restricts its search on the next level to those keys between the elements pointed to by two real lookahead pointers 407, the two lookahead pointers whose keys are the maximum below r and the minimum above r. The CA can find both lookahead pointers quickly using the duplicate lookahead pointers 408.

Which proves the lemma.

Lookahead pointers can also be used to achieve O(log N) block transfers for predecessor and successor queries and O(log N+L/B) block transfers for range queries, where L is the number of items reported.

With a few changes, it is possible to make the lookahead array cache-aware and achieve $O(\log_{B^\epsilon+1} N)$ block transfers per query and $O((\log_{B^\epsilon+1} N)/B^{1-\epsilon})$ block transfers per insertion for any $\epsilon \in [0, 1]$. Instead of having the array at level k be twice as big as the array at level k−1, one can have it grow in size by some arbitrary multiplicative factor g called the growth factor, e.g. g=2 yields the CA described above. For example, one could set $g=\Theta(B^\epsilon)$. In this case, instead of every eighth element of level k also appearing in level k−1, every $\Theta(B^\epsilon)$th element will appear as a lookahead pointer in the previous level. During queries one must look through $\Theta(B^\epsilon)$ instead of $\Theta(1)$ cells of each array, but $\Theta(B^\epsilon)$ cells still fit in at most 2 blocks implying a constant number of block transfers per level. When performing an insertion, the level being merged into may not be empty and one thus must merge the pre-existing items with the ones from the previous level. Since the sum of the sizes of the first k−1 levels is at least an $\Omega(1/B^\epsilon)$ fraction of the size of the kth level, a level is merged into at most $B^\epsilon$ times before its items participate in a merge into a future level. This fact, together with there being at most $O(\log_{B^\epsilon+1} N)$ levels, gives the amortized $O((\log_{B^\epsilon+1} N)/B^{1-\epsilon})$ insertion bound.

It will be apparent to one of ordinary skill in the art that the lookahead pointers could be kept in a separate array from the key value pairs.

The CA described here supports fixed-sized key-value pairs, but it will be apparent to one of ordinary skill in the art that key-value pairs of varying size can be supported by a SCA or a CA in several ways. One way to efficiently implement variable-sized key value pairs is, for each level, to maintain second array in addition to the first array 404. The second array holds the variable-sized keys and values packed into memory with no spaces between, stored in order according to the key. The first array 404, instead of holding the key-value pairs 406, stores a pointer to the corresponding key-value data in the second array. Thus the first array 404 would contain only lookahead pointers 408 407 and pointers into the second array.

In some cases it is advantageous to store the keys and values separately. For example, the values could be stored in a third array instead of the second array. In this way, additional disk transfers are not incurred to read values that correspond to keys that are not being examined.

It will be apparent to one of ordinary skill in the art that the worst-case performance of the CA can be reduced by performing the merge one element at a time (or a few elements at a time), rather than merging an entire array all at once.

It will be apparent to one of ordinary skill in the art that many of the same considerations that apply to a BBT also apply to a CA. For example, the CA may employ a different representation on disk than it employs in main memory.

Also, although the CA is described as a single large data structure laid out on disk, the array can be represented as blocks of a convenient size. Cached copies of the blocks can be maintained in main memory, and when blocks are written to disk they can be written to new locations so that a good version of each block is always available, even if, for example, there is a power failure.

Even if the block size, the size of main memory, the configuration of the prefetching mechanisms, and the RAID parameters are unknown, the CA achieves the performance described above. That is, the CA is cache oblivious.

Logging

It can be useful for a data dictionary to be able to recover from a crash. That is, if the computer system stops operating at any particular moment in time, there should be enough information on the disk drive to reconstruct a consistent version of the dictionary. To support transactions, the reconstructed dictionary should reflect the changes made by the transactions that have committed, and should reflect no changes made by transactions that were not committed.

One way to implement recoverability is via logging. Here we describe a logging system that records enough information in a write-ahead log no that the log, in combination with the dictionary's on-disk representation, provides enough information to restore the dictionary to a consistent state after a system crash. If the user of the dictionary specifies that the dictionary should employ synchronous transactions, then the log provides enough information so that the restored data structure reflects the changes made by the committed transactions, and reflects no changes made by transactions that were uncommitted at the time of the crash.

The log, (sometimes called a write-ahead log) is conceptually a file on disk to which log entries are appended as the system operates. Although conceptually the log is a single large file, it can be implemented by using a sequence of small log files. As the system operates, it appends information into a small log file. When the small log file becomes sufficiently large, the system creates a new small log file, and starts appending information to the new file. After a period of operation, the system may have created many small log files. Some of the older log files can be deleted, under certain conditions. Some of the log files may be stored on different disk drives, some may be backed up to tape. It will be clear to one of ordinary skill in the art how to divide the log into small log files and how to manage the small log files. The large conceptual log can also be implemented by writing directly to the disk drive without using files from a file system. The rest of this section refers to a single log, with the understanding that the log may be distributed across several files or disks.

The log is conceptually a sequence of log entries. A log entry is a sequence of fields. The first field is a single byte called the entry type. The remaining fields depend on the entry type. Every log entry ends with the length, a 64-bit integer field which indicates the length, in bytes, of the log entry. The length makes it convenient to traverse the log entries in reverse order by making it possible, given a log entry, to find the beginning of the previous log entry.

It will be clear to one of ordinary skill in the art that other encodings of the log can be used. For example, the length field could be omitted, since in principle one could scan the log from beginning to end to find the beginning of every log entry. Alternatively, the length of a log entry may be computable from other information found in the log. The log might be compressed to reduce its size when stored on disk.

In many cases, a dictionary is organized as a collection of blocks, as described earlier. These blocks may be the same size as the underlying blocks of the disk drive (e.g., 512 bytes or 4096 bytes), or they may be some other size, chosen to maximize performance, maximize space utilization, minimize bookkeeping, or for other criteria. When, during a transaction, a change is made to some data in a particular block, the system first writes a copy of the unmodified block into the log. This process is called physical logging. After the physical logging completes, then the system modifies the block. At some later point, the modified block will be written back to disk. To ensure that the dictionary can be restored to a consistent state, the system ensures that the copy written to the log is actually written to disk before the modified block in the dictionary is written to disk. If the system crashes, then a correct copy of the original unmodified data is available to reconstruct an old consistent version of the dictionary. Thus, physical logging (or block logging) can be used to restore the dictionary to a consistent state. This scheme is called write-ahead logging, since log records are written ahead of changes to the underlying data structure.

The log also contains logical records indicating which values were inserted, deleted, or modified. These logical log records are designed to record idempotent operations. An operation is idempotent if the effect of executing the operation twice is the same as executing the operation once. Hence to increment a location, the log entry would indicate the new value, rather than indicating that the location was incremented. To replay the operation involves setting the location to the new value. The logical log may also contain information sufficient to undo the operation. For example, to modify a location, the log may contain the old value as well as the new value. Such a logical record can be played backward or forward. Thus, given a consistent state, logical logs can be used to recreate the state at any given point in time.

The log may also contain other records, such as records indicating that particular transactions have committed or aborted, information indicating which user accessed which data, or other information.

Another approach to logging the blocks is to avoid overwriting the original data in the dictionary by allocating new space, by always writing blocks to new locations. In this approach, the system maintains a directory of blocks, indicating for each block where on disk the block resides. Blocks are loaded into main memory when they are needed. When a block is evicted from main memory, if the block is modified, then an unused region of the disk drive is allocated, and the block is written there. The system updates the block directory so that if the same block is requested again in the future, the system will retrieve it from the newly allocated region of the disk. This scheme is called indirect logging.

The block directory itself must be saved to disk as well, eventually. Just as for the ordinary data, the block directory must be maintained in such a way that if the system crashes, the block directory can be recovered. The block directory could be maintained with write ahead logging or with indirect logging, or other schemes, (such as sequentially writing two copies of the directory to known locations on disk.) If the directory is organized into blocks, then those blocks could be a different size than the blocks of the main dictionary. If indirect logging is used, the resulting meta-directory may be much smaller than the directory itself. The meta-directory must be maintained in a recoverable fashion as well. There are situations where the meta-directory could logged with indirect logging, resulting in a meta-meta-directory, and this recursive structure can continue. Eventually, one of the directories would be so small that it would make sense to use write ahead logging or write the directory twice on disk.

One advantage of indirect logging is that multiple versions of the data can easily be maintained. This feature can be used to take snapshots of the dictionary, or to implement multiversion concurrency control.

Multiple dictionaries may use a single pool of memory blocks for caching, and a single log for logging. For example, a large database may maintain hundreds of dictionaries. A single log can be used for the entire database. The log can also be used to make other data structures recoverable. Examples of such data structures include, but are not limited to, hash tables, queues, priority queues, and arrays.

Eventually, the old version of the block on disk will be marked as unused. The old version must be kept if any of the following are true.

1. The new block has not been written to disk.
2. The block directory has not updated on disk.
3. The block is needed to represent some active version of the dictionary.
4. A transaction that modified the log page is pending.

There may be other reasons to keep old versions of log pages. After a block on disk is marked as unused, it can be used to some other modified block being written to disk.

Here is a log format that can be used in a system that employs only direct logging, one that employs only indirect logging, or one that employs both:

CHECKSTART, C, L: indicates that a checkpoint has started.
  During a checkpoint, every dirty version of a buffered block is written from memory to disk. For each such write, a MOVEPAGE entry or a BLOCKCHANGE entry is also inserted into the log. After writing the dirty version to disk, the buffered block is marked as clean. The following can occur: During a checkpoint, a block that was clean (or became clean) can become dirty again. The block may, or may not, be written to disk and marked as clean before the checkpoint completes. If the block is made dirty again, then the combination of the version that actually was written to disk, along with the log records that follow the CHECKSTART, is enough to construct a correct version of the log entry.
  The counter field, C, is a 128-bit entry counter that is incremented for every log entry.
  The length field, L, is the length of the entry. In this case the length field itself is 8 bytes the entry type is 1 byte, and the counter is 16 bytes, for a total of L=25.
CHECKEND, C, L: indicates that a checkpoint has completed. The invariant for recovery is that at any given time, one needs only the disk versions of every block, plus the log record.

C is the entry counter, and the entry length is L.

CHECKSUM, C, S, N L: In addition to the usual C and L fields, a CHECKSUM record includes a checksum S and a byte count N.

The checksum is a error-detection code that covers all the log records starting at (and including) the previous CHECKSUM entry, up to (but not including) this checksum entry. The byte count N indicates the total length of all the covered log entries. The checksum could be an MD5 sum, CRC code, or some other error-detection code. The CHECKSUM provides a way to verify that the covered log entries have not been corrupted.

C is the entry counter, S is the checksum, N is the byte count, and L is the length of the entry.

MOVEPAGE C a b P L: Move block P from location a to location b on disk. This move is typically performed because the block was modified, and a new value was written.

Some way is needed to verify that the new copy of the block is valid. One way to verify the validity of the new copy is valid is to include a checksum as part of the page itself.

Another way to verify the validity is the require that the MOVEPAGE log entry must not be written to disk until after the new page has been written to disk.

It may be advantageous to use both mechanisms, that is to include a checksum on the block and to ensure that the new copy of the block is written to disk before the MOVEPAGE log entry is written into the log.

C is entry counter, a and b are locations on disk, P is a block identifier, L is the length of the entry.

BLOCKCHANGE C P o n L: Record a change to block P. o is a sequence of bytes containing the old block contents, and n is a sequence of bytes containing the new block contents.

C is the entry counter, P is the block identifier, o and n are block contents, and L is the length of the entry.

INSERT C T D K V L: Insert a key-value pair (K, V) into the dictionary named D as part of transaction T.

The key K and value V both specify their lengths as part of their representation. This can be done by representing a key or value as a length (e.g., with a 32-bit integer) followed by the bytes comprising the key or value.

C is the entry counter, T is a transaction identifier, D is a dictionary identifier, K is a key, V is a value, L is the length of the entry.

DELETE C T D K L: Delete all any existing key-value pair where the key equals K from dictionary D as part of transaction T.

C is the entry counter, T is a transaction identifier, D is a dictionary identifier, K is a key, and L is the length of the entry.

COMMIT C T t L: Commit transaction T at time t.

C is the entry counter, T is a transaction identifier, t is a timestamp, and L is the length of the entry.

ABORT C T L: Abort transaction T.

C is the entry counter, T is the transaction identifier, and L is the length of the entry.

If a transaction aborts, operations from that transaction must be undone, or rolled back. There are two ways to rollback operations. One is to undo changes made to physical blocks, and the other is to insert commands that rollback the changes. When undoing changes made to physical blocks, the system restores each block to its original state.

The approach of inserting commands to rollback changes can be implemented as follows: Consider the BBT. Each command in a buffer is annotated with additional information indicating which transaction inserted the command. Commands with the same key do not overwrite each other until their transaction commits. For example in FIG. 1, when the "Delete George" command in node 102 is pushed down to node 103, the "Insert George:41" command would be deleted. However, to support this style of rollback the "Delete George" command is annotated with a transaction identifier, and if the named transaction has not committed, then the "Insert George:41" is not yet deleted. Later when the transaction commits, the superseded "Insert" command is actually overwritten. This overwriting can be accomplished by placing a "Commit" command into the root buffer. The Commit command contains a key and a transaction identifier. The Commit command is eventually pushed down the tree, and if it ever meets an Insert or Delete command with the same key and the same transaction identifier, then 1. the commit command is removed from the buffer,
   2. any superseded commands in the same buffer are deleted, and
   3. the Insert or Delete command is marked as committed, so that as it is pushed down the tree, the system will know to delete any superseded commands.

It will be apparent to one of ordinary skill in the are that there are other ways to implement transaction rollback for a BBT or a CA.

Multiversion concurrency control (MVCC) can also be implemented either at the block level or the command level. Here we describe an embodiment that performs MVCC at a command level, although it will be apparent to one of ordinary skill in the art that it can be done at other levels in other ways. Each command is annotated with a timestamp, as well a transaction identifier. Each transaction is give a particular timestamp that does not change during the transaction. Several commands with different timestamps can coexist in the tree at the same time. Whenever one searches a particular key, the system collects all the key-value pairs along with their annotated timestamps. The system chooses the key-value pair that is committed and has the largest timestamp less than or equal to the transaction's timestamp. Thus several different versions of each key-value pair can be kept in the dictionary, and the appropriate one is returned for each transaction. A command that mentions a particular key k can be removed if, there is a more recent committed command mentioning k, and for every pending transaction, if that transaction were to look up k the aforementioned command would not affect the result (typically because there is a newer committed command that is older than the transaction.)

It will also be clear that other kinds of log entries can be used to gain the ability to recover from crashes. For example, instead of CHECKSTART and CHECKEND, one could have a single CHECKPOINT entry that serves as a combination of a CHECKSTART and a CHECKEND. For another example, every entry could have a checksum, rather than having a separate CHECKSUM entry that covers several records. For another example, the CHECKSUM may not be needed at all if the integrity of the log can be guaranteed by other means, such as relying on an underlying file system to produce uncorrupted logs.

In some cases, for two transactions to commit requires two disk transfers to the log. One to write the commit record for the first transaction, and one to write the commit record for the second transaction. In the case where two or more concurrent transactions commit at about the same time, the logging system described here can commit several transactions with only one disk transfer to the log. This is accomplished by buffering up several commit records, and writing them to disk in a single write, committing all the transactions.

It will be apparent to one of ordinary skill in the art that for some situations, writing blocks directly to the log is advantageous, and for some situations, indirect logging is advantageous.

It will be apparent to one of ordinary skill in the art that logs can be used for other purposes besides recovering from crashes. For example, logs can be used to restore a dictionary to any point in the past, so that if data was accidentally deleted, it can be recovered.

Streaming Dictionaries

It is to be understood that embodiments of the invention include the applications (i.e., the unexecuted or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM). It is also to be understood that other embodiments of the invention can provide the applications operating within the processor as the processes. Those of ordinary skill in the art will understand that the computer system may include other processes and/or software and hardware components, such as an operating system, which have been left out of this illustration for ease of description of the invention.

We have developed two embodiments that have the following properties:

Key-value pairs can be added to and removed from the dictionary at rates that are faster than one insertion per disk-head movement, A key can be looked up with only a logarithmic number of transfers, even after insertions or deletions.

In order to achieve insertion rates that are faster than one insertion per disk-head movement, our method, system, or software, operates as follows. When key-value pairs are inserted into the dictionary they are initially stored near other key-value pairs that are correlated by the time of insertion. For example, key-value pairs inserted at the about the same time are stored near each other. Over time, key-value pairs gradually move closer to other key-value pairs to which they are correlated by the key in dictionary order. For example, key-values with adjacent keys in the key ordering end up next to each other. In the BBT the key-value pairs move down the tree. In the CA the key-value pairs move down into deeper levels. In both cases, when key-value pairs reach the bottom of the data structure they are correlated by the key (e.g., in alphabetical order).

It will be apparent to one of ordinary skill in the art that there are other, equivalent, structures for storing key-value pairs such that the initial location of each pair is correlated in time, and the final location is correlated with the key ordering, and in which the number of transfers is less than the number of insertions, and in which key look ups can be performed quickly, such as in a logarithmic number of transfers.

One way to choose the block size is so that the block transfer time is approximately as large as to the disk seek time. For example, a Hitachi Deskstar SATA 7K250 disk drive has 8.8 millisecond average seek time, and sustained data rate that ranges between 30 and 60 megabytes per second. At 30 megabytes per second, 264 kilobytes can be transferred in 8.8 milliseconds. At 60 megabytes per second. 528 kilobytes can be transferred in 8.8 milliseconds. Thus if the block size is close to 500 kilobytes (or larger), then the block transfer time is close to (or larger than) the disk seek time. One of ordinary skill in the art will see that there may be reasons to make the block size somewhat larger or smaller.

For example, a disk drive with different performance parameters would result in a different block size calculation. For another example, in the context of a RAID disk array containing 10 disk drives, the transfer rate is about 10 times larger than for one disk, and so the block size should be chosen to be about 10 limes larger.

In another example, if the storage system is used in a write-intensive workload, it may make sense to make the block size larger. If the storage system is used in a range-scan-intensive workload, it may make sense to make the block size larger. On the other hand, if the storage system is used to perform many small reads of randomly chosen data, it may make sense to make the block size smaller.

The blocks could also vary in size—for example, blocks near the center of a disk might be chosen to be smaller because the transfer rate is smaller near the center of the disk. Blocks near the perimeter of the disk might be chosen to be correspondingly large. The blocks could also be chosen to match the track size of the disk drive.

It will also be apparent that when a block is stored to disk, that the block can be compressed to save on disk bandwidth and storage space. As a result of such compression, it may make sense to make the node size larger than the block size on disk to take advantage of the compression. In this case, it can make sense to adopt a flexible layout strategy, in which the physical layout of the blocks on disk is determined dynamically as the compressed blocks, which are of varying sizes, are generated. Other ways of organizing the disk into blocks will be apparent.

The blocks described here are not necessarily the same as the disk's sector size. Typically blocks used in accordance with the present disk-resident streaming dictionary are larger than the sectors (or hardware blocks) that the disk is organized into when it arrives from the manufacturer. For example, the Hitachi Deskstar 7K250 is organized into sectors of 512 bytes. Each block used in this invention typically includes several sectors.

Another way to choose a block size is to defer the choice to the underlying disk storage system or operating system. To do this, one can employ a cache-oblivious design such as the CA, which achieves asymptotically good performance for any block size without knowing the block size.

It will also be apparent to one of ordinary skill in the art that the methods, systems, and software described herein can be used to build other data structures besides dictionaries, such as disk-resident hash tables that can perform significantly more than one insertion per disk-head movement.

One version of the invention disclosed here achieves a worst-case look up cost of $O(\log_2 N)$ transfers, an average insertion cost of $O((\log_B N)/B)$, and worst-case range query cost of $O(V/B+\log_2 N)$. (The worst-case insertion cost is $O(\log_2 N)$ transfers.) Another version of the invention disclosed here achieves a worst-case look up cost of $O(\log_B N)$, an average insertion cost of $O((\log_B N)/\sqrt{B})$, and worst-case range query cost of $O(V/B+\log_2 N)$. (The worst-case insertion cost is $O(\log_B N)$ transfers.) Other tradeoffs between look up cost and insertion cost can be made, as shall be apparent to one of ordinary skill in the art.

Having described preferred embodiments of the invention it will now become apparent to those of ordinary skill in the art that other embodiments incorporating these concepts may be used. Instead of a hard disk drive, a dictionary may be stored other storage devices, such as flash memory or tape drives or other storage medium where writes are slow, or otherwise costly, or on which it is important to employ locality when accessing data.

The software included as part of the invention may be embodied in a computer program product that includes a computer useable medium. For example, such a computer usable medium can include a readable memory device, such as a hard drive device, a CD-ROM, a DVD-ROM, a computer diskette, or a flash memory device, having computer readable program code segments stored thereon. The computer readable medium can also include a communications link, either optical, wired, or wireless, having program code segments carried thereon as digital or analog signals.

Accordingly, it is submitted that that the invention should not be limited to the described embodiments but rather should be limited only by the spirit and scope of the appended claims.

The invention claimed is:

1. A method organizing data in a disk storage system comprising: organizing a plurality of key-value pairs, wherein a total ordering is applied upon the respective keys via placing respective key-value pairs in nodes structured as a tree, wherein the tree comprises at least one leaf node and at least one non-leaf node, wherein the leaf node includes at least one respective key-value pair, and wherein the non-leaf nodes comprise a buffer, a child pointer sequence and at least one pivot key from a pivot key sequence, wherein the leaf node comprises a root of a subtree;

wherein the buffer contains space for at least one of: an insert command, a delete command, and a different type of command, wherein the insert command is associated with a particular key-value pair, and the delete command is associated with a particular key, each child pointer from the child pointer sequence identifying a child node comprising a root of a child subtree; wherein, for each child pointer occurring after a primary child pointer in the child pointer sequence, there is a corresponding pivot key ordered before a pivot key associated with any subsequent child pointer occurring in the child pointer sequence, wherein the keys stored in a respective subtree referenced by a child pointer are ordered greater than any pivot key associated with the child pointer or any previous child pointer, wherein the keys stored in the subtree are ordered less than or equal to the pivot key associated with any subsequent child pointer;

wherein a first non-leaf node of the tree includes a first pivot key associated with a child pointer referencing a root of a first subtree, a second pivot key associated with a child pointer referencing a root of a second subtree and a first buffer, where the first pivot key is ordered in the first non-leaf node before the second pivot key according to the pivot key sequence;

wherein the root of the first subtree includes a third pivot key and second buffer, a wherein the pivot key sequence orders the third pivot key between the first pivot key and the second pivot key;

wherein the first subtree includes a first leaf node for storing at least one key-value pair having a key corresponding to a position in the pivot key sequence occurring between the first pivot key and the third pivot key and a second leaf node for storing at least one key-value pair having a key corresponding to a position in the pivot key sequence occurring between the third pivot key and the second pivot key;

wherein the first buffer includes an insert command identifying the key and a value of a first key-value pair currently in the first leaf node; wherein the second buffer includes a delete command identifying the key of the first key-value pair; upon detecting the first buffer has reached a threshold capacity, pushing the insert command from the first buffer to the second buffer of the first subtree;

upon detecting the insert command in the second buffer, removing the delete command from the second buffer based on the insert command being newer than the delete command;

upon inserting a command into the buffer of the root node of a subtree, if the buffer overflows, then a child node which is the root of a child subtree is chosen, and some commands are pushed form the buffer of the root of the subtree into the child subtree, removing the commands from the buffer of the root of the subtree into the child subtree, where to push a command into a non-leaf node inserts the commands into the buffer of the node;

to insert a key-value pair into a subtree, a command to insert the key-value pair is pushed into the root node of the subtree; and in which to look up the successor of a query key, at least one leaf node is searched and the buffers of the ancestors of the leaf nodes are searched, the system returning the key-value pair in those buffers and that leaf node that has the smallest key greater than the query key.

2. The method of claim 1 further comprising: in which to look up a key in a subtree rooted at a node, the buffer of the node is searched for via a command containing the key, returning the key-value pair of the command if the command containing the key is found and the command containing the key is an insert command, returning an indication that the key is not found if the command containing the key is a delete command; and upon returning the indication that the key is not found, utilizing the respective pivot keys of the node to determine an appropriate child node, and the key is then looked up in the subtree rooted at the child node.

3. The method of claim 2, further comprising in which upon inserting a command into the buffer of the root node of a subtree, if the buffer overflows, then a child node which is the root of a child subtree is chosen, and some commands are pushed from the buffer of the root of the subtree into the child subtree, removing the commands from the buffer of the root of the subtree, where to push a command into a non-leaf node inserts the command into the buffer of the node.

4. The method of claim 3 further comprising in which to insert a key-value pair into a subtree, a command to insert the key-value pair is pushed into the root node of the subtree.

5. The method of claim 4 further comprising to push an insert command into a leaf node, the corresponding key-value pair is inserted into the set of key-value pairs of the leaf node, removing any previously extant key-value pairs that have the same key from the set.

6. The method of claim 5 further comprising in which to delete a key-value pair from a subtree, a delete command identifying the key is pushed into the root node of the subtree.

7. The method of claim 6 further comprising to push a delete command into a leaf node, any key-value pair with a matching key is removed from the set of key-value pairs of the leaf node.

8. The method of claim 1 further comprising to push an insert command into a leaf node, the corresponding key-value pair is inserted into the set of key-value pairs of the leaf node, removing any previously extant key-value pairs that have the same key from the set.

9. The method of claim 1 key-value pair from a subtree, a delete command identifying the key is pushed into the root node of the subtree.

10. The method of claim 9 further comprising to push a delete command into a leaf node, any key-value pair with a matching key is removed from the set of key-value pairs of the leaf node.

11. A non-transitory computer readable medium having computer readable code thereon for organizing data in a disk storage system comprising: instructions for organizing a plurality of key-value pairs, wherein a total ordering is applied upon the respective keys via placing respective key-value pairs in nodes structured as a tree, wherein the tree comprises at least one leaf node and at least one non-leaf node, wherein the leaf node includes at least one respective key-value pair, and wherein the non-leaf nodes comprise a buffer, a child pointer sequence and at least one pivot key from a pivot key sequence, wherein the leaf node comprises a root of a subtree;
 wherein the buffer contains space for at least one of: an insert command, a delete command, and a different type of command, wherein the insert command is associated with a particular key-value pair, and the delete command is associated with a particular key, each child pointer from the child pointer sequence identifying a child node comprising a root of a child subtree;
 wherein, for each child pointer occurring after a primary child pointer in the child pointer sequence, there is a corresponding pivot key ordered before a pivot key associated with any subsequent child pointer occurring in the child pointer sequence, wherein the keys stored in a respective subtree referenced by a child pointer are ordered greater than any pivot key associated with the child pointer or any previous child pointer, wherein the keys stored in the subtree are ordered less than or equal to the pivot key associated with any subsequent child pointer;
 wherein a first non-leaf node of the tree includes a first pivot key associated with a child pointer referencing a root of a first subtree, a second pivot key associated with a child pointer referencing a root of a second subtree and a first buffer, where the first pivot key is ordered in the first non-leaf node before the second pivot key according to the pivot key sequence; wherein the root of the first subtree includes a third pivot key and a second buffer, wherein the pivot key sequence orders the third pivot key between the first pivot key and the second pivot key;
 wherein the first subtree includes a first leaf node for storing at least one key-value pair having a key corresponding to a position in the pivot key sequence occurring between the first pivot key and the third pivot key and a second leaf node for storing at least one key-value pair having a key corresponding to a position in the pivot key sequence occurring between the third pivot key and the second pivot key; wherein the first buffer includes an insert command identifying the key and a value of a first key-value pair currently in the first leaf node; wherein the second buffer includes a delete command identifying the key of the first key-value pair; instructions for pushing the insert command from the first buffer to the second buffer of the first subtree upon detecting the first buffer has reached a threshold capacity;
 instructions for removing the delete command from the second buffer, upon detecting the insert command has entered the second buffer, based on the insert command being newer than the delete command;
 upon inserting a command into the buffer of the root node of a subtree, if the buffer overflows, then a child node which is the root of a child subtree is chosen, and some commands are pushed form the buffer of the root of the subtree into the child subtree, removing the commands from the buffer of the root of the subtree into the child subtree, where to push a command into a non-leaf node inserts the commands into the buffer of the node;
 to insert a key-value pair into a subtree, a command to insert the key-value pair is pushed into the root node of the subtree; and
 in which to look up the successor of a query key, at least one leaf node is searched and the buffers of the ancestors of the leaf nodes are searched, the system returning the key-value pair in those buffers and that leaf node that has the smallest key greater than the query key.

12. The computer readable medium of claim 11 further comprising instructions for in which to look up a key in a subtree rooted at a node, the buffer of the node is searched for via a command containing the key, returning the key-value pair of the command if the command containing the key is found and the command containing the key is an insert command, returning an indication that the key is not found if the command containing the key is a delete command; and upon returning the indication that the key is not found, utilizing the respective pivot keys of the node to determine an appropriate child node, and the key is then looked up in the subtree rooted at the child node.

13. The computer readable medium of claim 12, further comprising instructions for in which upon inserting a command into the buffer of the root node of a subtree, if the buffer overflows, then a child node which is the root of a child subtree is chosen, and some commands are pushed from the buffer of the root of the subtree into the child subtree, removing the commands from the buffer of the root of the subtree, where to push a command into a non-leaf node inserts the command into the buffer of the node.

14. The computer readable medium of claim 13 further comprising instructions for in which to insert a key-value pair into a subtree, a command to insert the key-value pair is pushed into the root node of the subtree.

15. The computer readable medium of claim 14 further comprising instructions for to push an insert command into a leaf node, the corresponding key-value pair is inserted into the set of key-value pairs of the leaf node, removing any previously extant key-value pairs that have the same key from the set.

16. The computer readable medium of claim 15 further comprising instructions for in which to delete a key-value pair from a subtree, a delete command identifying the key is pushed into the root node of the subtree.

17. The computer readable medium of claim 16 further comprising instructions for to push a delete command into a leaf node, any key-value pair with a matching key is removed from the set of key-value pairs of the leaf node.

18. The computer readable medium of claim 11 further comprising instructions for to push an insert command into a leaf node, the corresponding key-value pair is inserted into the set of key-value pairs of the leaf node, removing any previously extant key-value pairs that have the same key from the set.

19. The computer readable medium of claim 11 further comprising instructions for in which to delete a key-value pair from a subtree, a delete command identifying the key is pushed into the root node of the subtree.

20. The computer readable medium of claim 19 further comprising instructions for to push a delete command into a leaf node, any key-value pair with a matching key is removed from the set of key-value pairs of the leaf node.

21. A computer system comprising a processor; a main memory; a disk; and wherein the memory is encoded with an application for storing data on the disk, that when performed on the processor, provides a process for processing information, the process causing the computer system to perform the operations of organizing data in a disk storage system comprising:

organizing a plurality of key-value pairs, wherein a total ordering is applied upon the respective keys via placing respective key-value pairs in nodes structured as a tree, wherein the tree comprises at least one leaf node and at least one non-leaf node, wherein the leaf node includes at least one respective key-value pair, and wherein the non-leaf nodes comprise a buffer, a child pointer sequence and at least one pivot key from a pivot key sequence, wherein the leaf node comprises a root of a subtree;

wherein the buffer contains space for at least one of: an insert command, a delete command, and a different type of command, wherein the insert command is associated with a particular key-value pair, and the delete command is associated with a particular key, each child pointer from the child pointer sequence identifying a child node comprising a root of a child subtree;

wherein, for each child pointer occurring after a primary child pointer in the child pointer sequence, there is a corresponding pivot key ordered before a pivot key associated with any subsequent child pointer occurring in the child pointer sequence, wherein the keys stored in a respective subtree referenced by a child pointer are ordered greater than any pivot key associated with the child pointer or any previous child pointer, wherein the keys stored in the subtree are ordered less than or equal to the pivot key associated with any subsequent child pointer;

wherein a first non-leaf node of the tree includes a first pivot key associated with a child pointer referencing a root of a first subtree, a second pivot key associated with a child pointer referencing a root of a second subtree and a first buffer, where the first pivot key is ordered in the first non-leaf node before the second pivot key according to the pivot key sequence;

wherein the root of the first subtree includes a third pivot key and a second buffer, wherein the pivot key sequence orders the third pivot key between the first pivot key and the second pivot key; wherein the first subtree includes a first leaf node for storing at least one key-value pair having a key corresponding to a position in the pivot key sequence occurring between the first pivot key and the third pivot key and a second leaf node for storing at least one key-value pair having a key corresponding to a position in the pivot key sequence occurring between the third pivot key and the second pivot key;

wherein the first buffer includes an insert command identifying the key and a value of a first key-value pair currently in the first leaf node; wherein the second buffer includes a delete command identifying the key of the first key-value pair; upon detecting the first buffer has reached a threshold capacity, pushing the insert command from the first buffer to the second buffer of the first subtree;

upon detecting the insert command in the second buffer, removing the delete command from the second buffer based on the insert command being newer than the delete command;

upon inserting a command into the buffer of the root node of a subtree, if the buffer overflows, then a child node which is the root of a child subtree is chosen, and some commands are pushed form the buffer of the root of the subtree into the child subtree, removing the commands from the buffer of the root of the subtree into the child subtree, where to push a command into a non-leaf node inserts the commands into the buffer of the node;

to insert a key-value pair into a subtree, a command to insert the key-value pair is pushed into the root node of the subtree; and in which to look up the successor of a query key, at least one leaf node is searched and the buffers of the ancestors of the leaf nodes are searched, the system returning the key-value pair in those buffers and that leaf node that has the smallest key greater than the query key.

22. The computer system of claim 21 further comprising in which to look up a key in a subtree rooted at a node, the buffer of the node is searched for via a command containing the key, returning the key-value pair of the command if the command containing the key is found and the command containing the key is an insert command, returning an indication that the key is not found if the command containing the key is a delete command; and upon returning the indication that the key is not found, utilizing the respective pivot keys of the node to determine an appropriate child node, and the key is then looked up in the subtree rooted at the child node.

23. The computer system of claim 22, further comprising in which upon inserting a command into the buffer of the root node of a subtree, if the buffer overflows, then a child node which is the root of a child subtree is chosen, and some commands are pushed from the buffer of the root of the subtree into the child subtree, removing the commands from the buffer of the root of the subtree, where to push a command into a non-leaf node inserts the command into the buffer of the node.

24. The computer system of claim 23 further comprising in which to insert a key-value pair into a subtree, a command to insert the key-value pair is pushed into the root node of the subtree.

25. The computer system of claim 24 further comprising to push an insert command into a leaf node, the corresponding key-value pair is inserted into the set of key-value pairs of the leaf node, removing any previously extant key-value pairs that have the same key from the set.

26. The computer system of claim 25 further comprising in which to delete a key-value pair from a subtree, a delete command identifying the key is pushed into the root node of the subtree.

27. The computer system of claim 26 further comprising to push a delete command into a leaf node, any key-value pair with a matching key is removed from the set of key-value pairs of the leaf node.

28. The computer system of claim 21 further comprising to push an insert command into a leaf node, the corresponding key-value pair is inserted into the set of key-value pairs of the leaf node, removing any previously extant key-value pairs that have the same key from the set.

29. The computer system of claim 21 further comprising in which to delete a key-value pair from a subtree, a delete command identifying the key is pushed into the root node of the subtree.

30. The computer system of claim 29 further comprising to push a delete command into a leaf node, any key-value pair with a matching key is removed from the set of key-value pairs of the leaf node.

31. The method as in claim 1, wherein inserting the command includes: inserting a first command into the buffer of the root node of the subtree, the buffer of the root node of the subtree already containing a second command; and as the some commands are pushed from the buffer of the root of the subtree: removing the first command from the buffer of the root node of the subtree; inserting the first command into the buffer of the node; and keeping the second command in the buffer of the root node of the subtree.

* * * * *